US012697961B2

(12) United States Patent
Wang et al.

(10) Patent No.: US 12,697,961 B2
(45) Date of Patent: Aug. 4, 2026

(54) METHOD AND APPARATUS FOR DETERMINING PULL-OUT DIRECTION

(71) Applicant: Yinwang Intelligent Technologies Co., Ltd., Shenzhen (CN)

(72) Inventors: Junxia Wang, Shanghai (CN); Chang Shi, Shenzhen (CN); Wenxiao Hu, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 174 days.

(21) Appl. No.: 18/431,735

(22) Filed: Feb. 2, 2024

(65) Prior Publication Data

US 2024/0174217 A1     May 30, 2024

Related U.S. Application Data

(63) Continuation of application No. PCT/CN2021/110214, filed on Aug. 3, 2021.

(51) Int. Cl.
*B60Q 1/48* (2006.01)
*B60W 30/06* (2006.01)
(Continued)

(52) U.S. Cl.
CPC ............ *B60W 30/06* (2013.01); *B60W 50/14* (2013.01); *B60W 60/0015* (2020.02);
(Continued)

(58) Field of Classification Search
CPC .. B60W 30/06; B60W 50/14; B60W 60/0015; B60W 60/0021;
(Continued)

(56) References Cited

U.S. PATENT DOCUMENTS 8,710,975 B2 *   4/2014   Pampus ................ B60Q 1/346
                                                        701/41
2019/0113933 A1 *   4/2019   Ha ....................... G05D 1/0238
                   (Continued)

FOREIGN PATENT DOCUMENTS

CN        112224198 A      1/2021
CN        112224199 A      1/2021
                   (Continued)

OTHER PUBLICATIONS

Jiang et al., "Multi-condition Parking Space identification and decision planning of automatic parking system based on information fusion," Journal of Mechanical Engineering, vol. 57 No. 6, Multi-condition parking space recognition based on information fusion and decision planning of automatic parking system, total 33 pages (Mar. 2021). With an English Abstract.

*Primary Examiner* — Anh V La
(74) *Attorney, Agent, or Firm* — Leydig, Voit & Mayer, Ltd.

(57)                ABSTRACT

This application provides a method and an apparatus for determining a pull-out direction. The method includes: obtaining environmental information of a current parking space and a parking record of a vehicle; and determining, based on the environmental information and the parking record, a first direction towards which the vehicle pulls out of the current parking space. According to the method for determining a pull-out direction provided by this application, an appropriate pull-out solution is recommended to a user based on the environmental information of the current parking space and the parking record of the vehicle. This improves user experience and ensures driving safety.

20 Claims, 8 Drawing Sheets

Pull-in direction

Pull-out direction

(51) Int. Cl.
    *B60W 50/14*         (2020.01)
    *B60W 60/00*         (2020.01)

(52) U.S. Cl.
    CPC ... *B60W 60/0021* (2020.02); *B60W 2050/146*
        (2013.01); *B60W 2540/215* (2020.02); *B60W*
        *2556/10* (2020.02)

(58) Field of Classification Search
    CPC ..... B60W 2050/146; B60W 2540/215; B60W
        2556/10; B62D 15/027; B62D 15/0285;
        G08G 1/096838; G08G 1/09685; G08G
        1/096861; G08G 1/096888; G08G 1/143;
        G08G 1/147
    USPC ...................... 340/932.2, 933, 988, 435, 436
    See application file for complete search history.

(56)                References Cited

U.S. PATENT DOCUMENTS

| | | | |
|---|---|---|---|
| 2019/0185055 A1* | 6/2019 | Iwami ................... | B60W 30/06 |
| 2020/0208990 A1* | 7/2020 | Max ................... | G01C 21/3685 |
| 2020/0218249 A1* | 7/2020 | Sannodo .............. | G05D 1/0016 |
| 2022/0379925 A1* | 12/2022 | Sato ................. | B60W 60/0059 |

FOREIGN PATENT DOCUMENTS

| | | |
|---|---|---|
| CN | 112896148 A | 6/2021 |
| DE | 102011086281 A1 | 5/2013 |

* cited by examiner

S301: Obtain environment information of a current parking space and a pull-out record of a vehicle S302: Determine, based on the environment information and the pull-out record, a first direction in which the vehicle pulls out of the current parking space A system provides optional pull-out directions and a recommended pull-out direction Current location Destination (a)

A user makes reselection or performs manual pull-out

Current location

Destination (b)

Make a recommendation based on a previous pull-out direction of the user

Current location

Destination (c)

Pull-in direction

Pull-out direction

Parallel
parking
space (a)        (b)        (c)        (d)

Perpendicular parking space (a)     (b)     (c)

Start     ✕

Autonomous parking is ready

METHOD AND APPARATUS FOR DETERMINING PULL-OUT DIRECTION

CROSS-REFERENCE TO RELATED APPLICATIONS

This application is a continuation of International Application No. PCT/CN2021/110214, filed on Aug. 3, 2021, the disclosure of which is hereby incorporated by reference in its entirety.

TECHNICAL FIELD

This application relates to the field of intelligent driving, furthermore, to a method and an apparatus for determining a pull-out direction.

BACKGROUND

Currently, an automated parking system is configured in most intelligent vehicles, and is used to help a user implement intelligent parking. The automated parking system is a system that identifies an effective parking space by using a vehicle-mounted sensor (including an ultrasonic radar, a camera, or the like) and controls a vehicle to park by using a control unit. The automated parking system is an auxiliary driving system that enables the vehicle to pull in a parking space or pull out of a parking space in a correct manner. Most of existing automatic parking systems focus on how to help a user better pull in a parking space, but less on how to pull out of a parking space. Therefore, existing intelligent pull-out solutions are not user-friendly. For example, in an existing intelligent pull-out solution, a user needs to manually select a type of a current parking space, and the user further needs to manually select a pull-out direction after determining the type of the parking space. In another existing intelligent pull-out solution, a prerequisite for using the intelligent pull-out solution by a user is to use intelligent pull-in. During intelligent pull-out, a vehicle returns, in a direction and along a route of intelligent pull-in, to a location at which the intelligent pull-in is enabled. Further, during intelligent pull-in, the vehicle needs to be free from user's interference, including fine-tuning on a location of the vehicle after pull-in. Therefore, interaction procedures of current intelligent pull-out methods are complex and not user-friendly, and user experience is poor.

SUMMARY

This application provides a method and an apparatus for determining a pull-out direction, so as to recommend an appropriate pull-out solution to a user based on environmental information of a current parking space and a parking record of a vehicle. This improves user experience and ensures driving safety.

According to a first aspect, a method for determining a pull-out direction is provided. The method includes: obtaining environmental information of a current parking space and a parking record of a vehicle; and determining, based on the environmental information and the parking record, a first direction towards which the vehicle pulls out of the current parking space.

According to the method for determining a pull-out direction in this embodiment of this application, the direction of pulling out of the current parking space is determined based on the environmental information of the current parking space and the parking record of the vehicle. A plurality of currently optional pull-out directions are determined by comprehensively considering obstacle information, lane line information and a type of the current parking space. Further, a pull-out direction that is in the plurality of optional pull-out directions and that is most in line with a habit of the user, that is most convenient for subsequent driving of the user, or that is most suitable for the current parking space is determined based on the parking record. This improves user experience.

In some possible implementations, the environmental information includes at least one of obstacle information, lane line information, and a parking space type of the current parking space.

According to the method for determining a parking direction in this embodiment of this application, a plurality of optional pull-out directions of the current parking space are comprehensively determined with reference to a plurality of pieces of environmental information. This is more intelligent.

In some possible implementations, the parking record includes a pull-out record and a pull-in record, the pull-out record includes historical records of pulling out of the current parking space and another parking space by the vehicle, and the pull-in record includes a historical record of pulling in the current parking space by the vehicle.

In some possible implementations, the determining, based on the environmental information and the parking record, a first direction towards which the vehicle pulls out of the current parking space includes: determining, based on the environmental information, one or more obstacle-free directions in which the vehicle pulls out of the current parking space; and determining the first direction based on the parking record and the one or more obstacle-free directions.

In some possible implementations, the determining, based on the parking record and the one or more obstacle-free directions, the first direction of pulling out of the current parking space includes: determining, based on the parking record, a direction with a largest quantity of pull-out times in the one or more obstacle-free directions; and using the direction with the largest quantity of pull-out times in the one or more obstacle-free directions as the first direction.

In some possible implementations, the direction with the largest quantity of pull-out times includes a direction towards which the vehicle pulls out of the current parking space for a largest quantity of times and a direction towards which the vehicle pulls out of a similar parking space for a largest quantity of times, and the similar parking space is a parking space whose similarity with the current parking space falls within a preset range.

According to the method for determining a pull-out direction in this embodiment of this application, the direction with the largest quantity of pull-out times in the parking record is used as a recommended pull-out direction, and includes the direction with the largest quantity of pull-out times in the current parking space and the direction with the largest quantity of pull-out times in the similar parking space. This is more in line with a use habit of the user.

In some possible implementations, the determining, based on the parking record and the one or more obstacle-free directions, the first direction of pulling out of the current parking space includes: determining, based on the parking record, a pull-out direction selected by a user for the current parking space in the parking record; and determining the first direction based on the one or more obstacle-free directions and the pull-out direction selected by the user for the current parking space, where the first direction is the pull-out direction selected by the user for the current parking space in the parking record, and the first direction is the obstacle-free direction.

If the user selects a pull-out direction instead of using a recommended pull-out direction, there is definitely a reason for the user. According to the method for determining a pull-out direction in this embodiment of this application, user selection is considered, and a direction that is selected by the user and that is of previously pulling out of the current parking space is used as a current recommended pull-out direction. This is more user-friendly.

In some possible implementations, a route that is to a destination and that is determined based on the pull-out direction selected by the user for the current parking space is shorter than a route that is to the destination and that is determined based on the direction with the largest quantity of pull-out times.

The foregoing is only an example of a possible reason why the user selects the pull-out direction. In actual application, the user selects a pull-out direction different from the recommended pull-out direction, and there is definitely a reason for the user. The reason may be that the user can more conveniently arrive at the destination, or that a route determined based on the pull-out direction selected by the user better meets a preference of the user. In the method in this embodiment of this application, these possibilities are fully considered, and the pull-out direction is recommended based on user selection, so that user experience can be further improved.

In some possible implementations, the determining, based on the parking record and the one or more obstacle-free directions, the first direction of pulling out of the current parking space includes: determining, based on the parking record, a direction towards which the vehicle pulls in the current parking space in the parking record; and determining, based on a direction towards which the vehicle pulls in the current parking space last time in the parking record, the first direction towards which the vehicle pulls out of the current parking space, where the first direction is the obstacle-free direction.

In the method for determining a pull-out direction in this embodiment of this application, the pull-out direction may alternatively be determined based on a pull-in route, to be used as an alternative solution.

In some possible implementations, the method further includes: determining, based on the environmental information, the parking record, a preset traffic rule, or the parking space type of the current parking space, the first direction of pulling out of the current parking space.

When there is no pull-out record of the current parking space in the parking record and there is no pull-out record of a parking space similar to the current parking space, and a priority of a solution for determining the pull-out direction based on the pull-in record is lower, a direction of pulling out of the current parking space may be determined based on the environmental information and the preset traffic rule. This ensures that the vehicle can provide optional pull-out solutions for the user in various parking environments, so that user experience is improved. In addition, all these pull-out solutions comply with the preset traffic rule, so that driving safety is ensured.

In some possible implementations, the method further includes: displaying the one or more obstacle-free directions on an interaction interface for user selection, where the one or more obstacle-free directions include the first direction; and pulling out of the current parking space in the direction selected by the user from the one or more obstacle-free directions, or pulling out of the current parking space in the first direction when the user does not make selection.

According to the method for determining a pull-out direction in this embodiment of this application, a plurality of feasible pull-out solutions are provided. These pull-out solutions may be set based on a specific priority sequence, and may be adjusted based on an actual situation. The recommended pull-out direction and optional pull-out directions can be flexibly selected by the user based on an actual situation, to more flexibly adapt to an actual application scenario.

In some possible implementations, the method further includes: pulling out of the current parking space in the first direction, where the pulling out includes pulling out from a vehicle front or pulling out from a vehicle rear.

According to a second aspect, an apparatus for determining a pull-out direction is provided. The apparatus includes: an obtaining unit, configured to obtain environmental information of a current parking space and a parking record of a vehicle; and a processing unit, configured to determine, based on the environmental information and the parking record, a first direction towards which the vehicle pulls out of the current parking space.

In some possible implementations, the environmental information includes at least one of obstacle information, lane line information, and a parking space type of the current parking space.

In some possible implementations, the parking record includes a pull-out record and a pull-in record, the pull-out record includes historical records of pulling out of the current parking space and another parking space by the vehicle, and the pull-in record includes a historical record of pulling in the current parking space by the vehicle.

In some possible implementations, the processing unit is configured to: determine, based on the environmental information, one or more obstacle-free directions in which the vehicle pulls out of the current parking space; and determine a first direction based on the parking record and the one or more obstacle-free directions.

In some possible implementations, the processing unit is configured to: determine, based on the parking record, a direction with a largest quantity of pull-out times in the one or more obstacle-free directions; and use the direction with the largest quantity of pull-out times in the one or more obstacle-free directions as the first direction.

In some possible implementations, the direction with the largest quantity of pull-out times includes a direction towards which the vehicle pulls out of the current parking space for a largest quantity of times and a direction towards which the vehicle pulls out of a similar parking space for a largest quantity of times, and the similar parking space is a parking space whose similarity with the current parking space falls within a preset range.

In some possible implementations, the processing unit is configured to: determine, based on the parking record, a pull-out direction selected by a user for the current parking space in the parking record; and determine the first direction based on the one or more obstacle-free directions and the pull-out direction selected by the user for the current parking space, where the first direction is the pull-out direction selected by the user for the current parking space in the parking record, and the first direction is the obstacle-free direction.

In some possible implementations, a route that is to a destination and that is determined based on the pull-out direction selected by the user for the current parking space is shorter than a route that is to the destination and that is determined based on the direction with the largest quantity of pull-out times.

In some possible implementations, the processing unit is configured to: determine, based on the parking record, a direction towards which the vehicle pulls in the current parking space in the parking record; and determine, based on a direction towards which the vehicle pulls in the current parking space last time in the parking record, the first direction towards which the vehicle pulls out of the current parking space, where the first direction is the obstacle-free direction.

In some possible implementations, the processing unit is further configured to determine, based on the environmental information, the parking record, a preset traffic rule, or the parking space type of the current parking space, the first direction of pulling out of the current parking space.

In some possible implementations, the processing unit is further configured to: display the one or more obstacle-free directions on an interaction interface for user selection, where the one or more obstacle-free directions include the first direction; and pull out of the current parking space in the direction selected by the user from the one or more obstacle-free directions, or pull out of the current parking space in the first direction when the user does not make a selection.

According to a third aspect, a computing device is provided, and includes at least one processor and a memory. The at least one processor is coupled to the memory, and is configured to read and execute instructions in the memory, to perform the method in any one of the possible implementations according to the first aspect.

According to a fourth aspect, a computer-readable medium is provided. The computer-readable medium stores program code. When the computer program code is run on a computer, the computer is enabled to perform the method in any one of the possible implementations according to the first aspect.

According to a fifth aspect, a chip is provided, and includes at least one processor and a memory. The at least one processor is coupled to the memory, and is configured to read and execute instructions in the memory, to perform the method in any one of the possible implementations according to the first aspect.

According to a sixth aspect, an autonomous driving vehicle is provided, and includes at least one processor and a memory. The at least one processor is coupled to the memory, and is configured to read and execute instructions in the memory, to perform the method in any one of the possible implementations according to the first aspect.

DESCRIPTION OF EMBODIMENTS

Most of existing parking technologies focus on how to pull in a parking space, and there is little research on how to pull out of the parking space. In addition, in an existing intelligent pull-out technology, a vehicle usually pulls out along an original route based on a pull-in route, or a user needs to determine and select a type of a current parking space. This lacks intelligence and is not user-friendly. Consequently, user experience is poor. Therefore, embodiments of this application provide a method for determining a pull-out direction, so as to recommend an appropriate pull-out solution to a user based on environmental information of a current parking space and a parking record of a vehicle. This improves user experience and ensures driving safety.

The following describes technical solutions of this application with reference to accompanying drawings. To facilitate understanding, a scenario to which embodiments of this application are applicable is described below with reference to FIG. 1 by using an intelligent driving scenario as an example.

Figure 1:
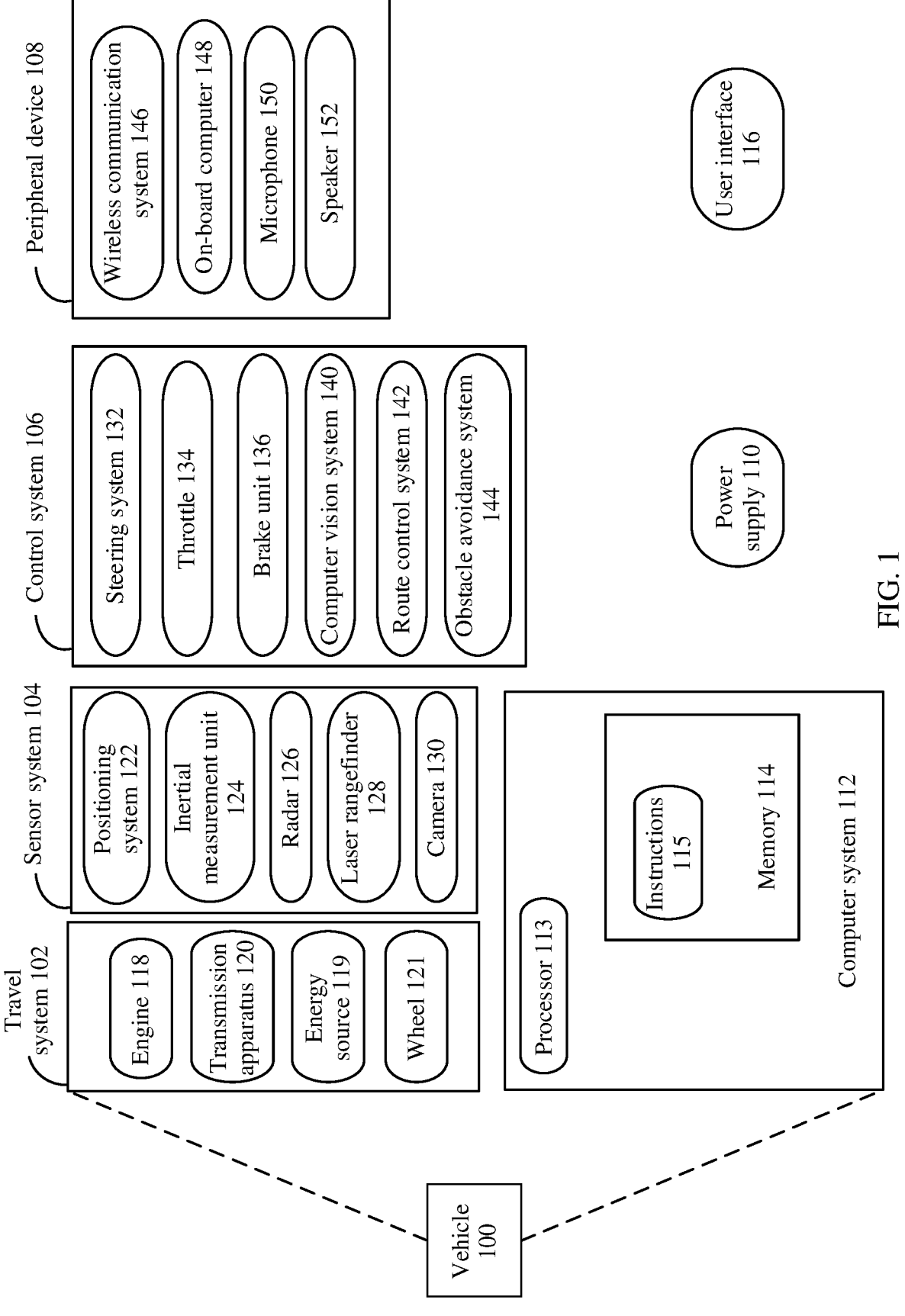
FIG. 1 is a schematic functional block diagram of a vehicle 100 according to an embodiment of this application.

FIG. 1 is a functional block diagram of a vehicle 100 according to an embodiment of this application. In an embodiment, the vehicle 100 is configured to be in a fully or partially autonomous driving mode. For example, the vehicle 100 in an autonomous driving mode may control the vehicle 100. A manual operation may be performed to determine current statuses of the vehicle and an ambient environment of the vehicle, and control the vehicle 100 based on determined information. When the vehicle 100 is in the autonomous driving mode, the vehicle 100 may be set to operate without interacting with a person.

The vehicle 100 may include various subsystems such as a travel system 102, a sensor system 104, a control system 106, one or more peripheral devices 108, a power supply 110, a computer system 112, and a user interface 116. In some embodiments, the vehicle 100 may include more or fewer subsystems, and each subsystem may include a plurality of components. In addition, all the subsystems and components of the vehicle 100 may be interconnected in a wired or wireless manner.

The travel system 102 may include a component providing power to the vehicle 100 to move. In an embodiment, the travel system 102 may include an engine 118, an energy source 119, a transmission apparatus 120, and a wheel/tire 121. The engine 118 may be an internal combustion engine, a motor, an air compression engine, or a combination of other types of engines, for example, a hybrid engine including a gasoline engine and a motor, or a hybrid engine including an internal combustion engine and an air compression engine. The engine 118 converts the energy source 119 into mechanical energy.

Examples of energy sources 119 include gasoline, diesel, other petroleum-based fuels, propane, other compressed gas-based fuels, anhydrous alcohol, solar panels, batteries, and other power sources. The energy source 119 may also provide energy for another system of the vehicle 100.

The transmission apparatus 120 may transmit mechanical power from the engine 118 to the wheel 121. The transmission apparatus 120 may include a gearbox, a differential, and a drive shaft. In an embodiment, the transmission apparatus 120 may further include another component, for example, a clutch. The drive shaft may include one or more shafts that may be coupled to one or more wheels 121.

The sensor system 104 (also referred to as a "collection device") may include several sensors that sense information about an ambient environment of the vehicle 100. For example, the sensor system 104 may include a positioning system 122 (the positioning system may be a global positioning system (GPS), or may be a BeiDou system or another positioning system), an inertial measurement unit (IMU) 124, a radar 126, a laser rangefinder 128, and a camera 130. The sensor system 104 may further include sensors (for example, an in-vehicle air quality monitor, a fuel gauge, and an engine oil thermometer) of an internal system of the vehicle 100 that is monitored. Sensor data from one or more of these sensors can be used to detect an object and corresponding features (a location, a shape, a direction, a speed, and the like) of the object. Such detection and identification are key functions for a safe operation of the autonomous vehicle 100. The sensor system 104 may obtain real-time environmental information around the vehicle 100, including a static or dynamic obstacle around the vehicle 100, a passable area, a lane line, and the like. When the vehicle 100 pulls in a parking space, the sensor system 104 may further obtain a type of the current parking space, including a perpendicular parking space, a parallel parking space, an angle parking space, or the like, to generate a better parking solution based on the type of the parking space. In addition, the sensor system 104 may further obtain an opening direction of the parking space, to determine a direction towards which the vehicle 100 can pull out. The sensor system 104 may further obtain an orientation of the vehicle 100 relative to the current parking space, to determine whether the vehicle 100 pulls out from a vehicle front or a vehicle rear.

The positioning system 122 may be configured to estimate a geographical location of the vehicle 100, for example, may estimate a parking space in which the vehicle is currently located. The IMU 124 is configured to sense a location and a head orientation change of the vehicle 100 based on an inertial acceleration. In an embodiment, the IMU 124 may be a combination of an accelerometer and a gyroscope.

The radar 126 may sense an object in the ambient environment of the vehicle 100 by using a radio signal. In some embodiments, in addition to sensing a target object, the radar 126 may be further configured to sense one or more statuses of a speed, a location, and a traveling direction of the target object.

The laser rangefinder 128 may sense, by using a laser, an object in an environment of the vehicle 100. In some embodiments, the laser rangefinder 128 may include one or more laser sources, a laser scanner, one or more detectors, and another system component.

The camera 130 may be configured to capture a plurality of images of the ambient environment of the vehicle 100. The camera 130 may be a static camera or a video camera.

The control system 106 controls operations of the vehicle 100 and components of the vehicle 100. The control system 106 may include various components, including a steering system 132, a throttle 134, a brake unit 136, a computer vision system 140, a route control system 142, and an obstacle avoidance system 144. In embodiments of this application, the control system 106 may enable the vehicle 100 to pull out of a current parking space based on a recommended pull-out solution or a pull-out solution selected by a user.

The steering system 132 may be operated to adjust a traveling direction of the vehicle 100. For example, in an embodiment, the steering system 133 may be a steering wheel system.

The throttle 134 is configured to control an operating speed of the engine 118 and further control a speed of the vehicle 100.

The brake unit 136 is configured to control the vehicle 100 to decelerate. The brake unit 136 may use friction to slow down the wheel 121. In another embodiment, the brake unit 136 may convert kinetic energy of the wheel 121 into a current. Alternatively, the brake unit 136 may reduce a rotational speed of the wheel 121 in another form to control the speed of the vehicle 100.

The computer vision system 140 may be operated to process and analyze an image captured by the camera 130, to identify an object and/or a feature in the ambient environment of the vehicle 100. The object and/or the feature may include a traffic signal, a road boundary, and an obstacle. The computer vision system 140 may use an object recognition algorithm, a structure from motion (SFM) algorithm, video tracking, and another computer vision technology. In some embodiments, the computer vision system 140 may be configured to draw a map for an environment, track an object, estimate a speed of the object, and the like.

The route control system 142 is configured to determine a driving route of the vehicle 100. In some embodiments, the route control system 142 may determine the driving route of the vehicle 100 with reference to data from the sensors, the GPS 122, and one or more predetermined maps.

The obstacle avoidance system 144 is configured to identify, evaluate, and avoid or otherwise to bypass a potential obstacle in the environment of the vehicle 100.

Certainly, in an example, the control system 106 may add or alternatively include components in addition to those shown and described, or may delete some of the foregoing components.

The vehicle 100 interacts with an external sensor, another vehicle, another computer system, or a user by using the peripheral device 108. The peripheral device 108 may include a wireless communication system 146, an on-board computer 148, a microphone 150, and/or a speaker 152.

In some embodiments, the peripheral device 108 provides a means for the user of the vehicle 100 to interact with the user interface 116. For example, the on-board computer 148 may provide information for the user of the vehicle 100. The user interface 116 may further operate the on-board computer 148 to receive an input from the user. The on-board computer 148 may perform an operation on a touchscreen. In another case, the peripheral device 108 may provide a means for the vehicle 100 to communicate with another device located in the vehicle. For example, the microphone

150 may receive audio (for example, a voice command or another audio input) from the user of the vehicle 100. Likewise, the speaker 152 may output audio to the user of the vehicle 100.

The wireless communication system 146 may perform wireless communication with one or more devices directly or through a communication network. For example, the wireless communication system 146 may use 3G cellular communication such as code division multiple access (CDMA), a global system for mobile communications (GSM)/GPRS, 4th generation (4G) communication such as LTE, or 5th generation (5G) communication. The wireless communication system 146 may communicate with a wireless local area network (WLAN) by using Wi-Fi. In some embodiments, the wireless communication system 146 may directly communicate with a device by using an infrared link, Bluetooth, or ZigBee. Other wireless protocols such as various vehicle communication systems may be used. For example, the wireless communication system 146 may include one or more dedicated short range communications (DSRC) devices, and these devices may include public and/or private data communication between vehicles and/or roadside stations.

The power supply 110 may supply power to various components of the vehicle 100. In an embodiment, the power supply 110 may be a rechargeable lithium-ion or lead-acid battery. One or more battery packs of such a battery may be configured as the power supply to supply power to the components of the vehicle 100. In some embodiments, the power supply 110 and the energy source 119 may be implemented together, for example, in some pure electric vehicles.

Some or all of functions of the vehicle 100 are controlled by the computer system 112. The computer system 112 may include at least one processor 113. The processor 113 executes instructions 115 stored in a non-transitory computer-readable medium like a data memory 114. The computer system 112 may alternatively be a plurality of computing devices that control an individual component or a subsystem of the vehicle 100 in a distributed manner.

The processor 113 may be any conventional processor like a commercially available central processing unit (CPU). Alternatively, the processor may be a dedicated device such as an application-specific integrated circuit (ASIC) or another hardware-based processor. Although FIG. 1 functionally illustrates the processor, the memory, and other components of a computer 110 in a same block, a person of ordinary skill in the art should understand that the processor, the computer, or the memory may actually include a plurality of processors, computers, or memories that may or may not be stored in a same physical housing. For example, the memory may be a hard disk drive, or another storage medium located in a housing different from that of the computer 110. Therefore, it is understood that a reference to the processor or the computer includes a reference to a set of processors or computers or memories that may or may not operate in parallel. Different from using a single processor to perform the steps described herein, some components such as a steering component and a speeding down component may include respective processors. The processor performs only computation related to a component-specific function.

In various aspects described herein, the processor may be located far away from the vehicle and perform wireless communication with the vehicle. In another aspect, some processes described herein are performed on a processor disposed inside the vehicle, while others are performed by a remote processor, including performing steps for single manipulation.

In some embodiments, the memory 114 may include the instructions 115 (for example, program logic), and the instructions 115 may be executed by the processor 113 to perform various functions of the vehicle 100, including the functions described above. The memory 114 may also include extra instructions, including instructions used to send data to, receive data from, interact with, and/or control one or more of the travel system 102, the sensor system 104, the control system 106, and the peripheral device 108.

In addition to the instructions 115, the memory 114 may further store data, such as a road map, route information, a location, a direction, and a speed of the vehicle, and other such vehicle data, as well as other information. Such information may be used by the vehicle 100 and the computer system 112 when the vehicle 100 operates in an autonomous mode, a semi-autonomous mode, and/or a manual mode. In embodiments of this application, the memory 114 is further configured to store a historical pull-out record of the vehicle 100.

In some embodiments, the processor 113 may further perform a parking solution in embodiments of this application, and determine, based on the environmental information that is of the current parking space and that is obtained by the sensor system 104 and the historical pull-out record stored in the memory 114, a possible solution for pulling out of the current parking space. For an exemplary method, refer to the following descriptions. For brevity, details are not described herein again.

The user interface 116 is configured to provide information for or receive information from the user of the vehicle 100. In some embodiments, the user interface 116 may include one or more input/output devices in a set of peripheral devices 108, for example, the wireless communication system 146, the on-board computer 148, the microphone 150, and the speaker 152.

The computer system 112 may control a function of the vehicle 100 based on inputs received from various subsystems (for example, the travel system 102, the sensor system 104, and the control system 106) and from the user interface 116. For example, the computer system 112 may use an input from the control system 106 to control the steering unit 132 to avoid an obstacle detected by the sensor system 104 and the obstacle avoidance system 144. In some embodiments, the computer system 112 may be operated to provide control over many aspects of the vehicle 100 and the subsystems of the vehicle 100.

In some embodiments, one or more of the components may be installed separately from or associated with the vehicle 100. For example, the memory 114 may be partially or totally separated from the vehicle 100. The foregoing components may be communicatively coupled together in a wired and/or wireless manner.

In some embodiments, the foregoing components are merely examples. In actual application, components in the foregoing modules may be added or removed based on an actual requirement. FIG. 1 should not be construed as a limitation on embodiments of this application.

The vehicle 100 may be a car, a truck, a motorcycle, a bus, a boat, an airplane, a helicopter, a lawn mower, a recreational vehicle, a playground vehicle, a construction device, a trolley, a golf cart, a train, or the like. This is not limited in embodiments of this application.

Figures 2, 3:
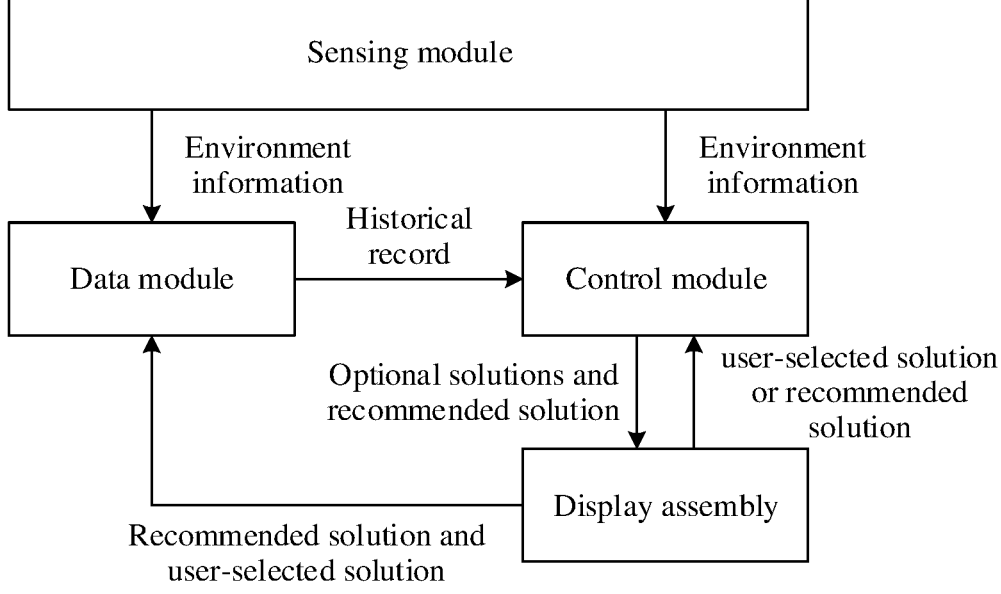
FIG. 2 is a schematic diagram of a system architecture to which a method for determining a pull-out direction is applied according to an embodiment of this application.
FIG. 3 is a schematic flowchart of a method for determining a pull-out direction according to an embodiment of this application.

FIG. 2 is a schematic diagram of a system architecture to which a method for determining a pull-out direction is applied according to an embodiment of this application. As shown in FIG. 2, a system includes a sensing module, a data module, a control module, and a display assembly. The system shown in FIG. 2 may be applied to a scenario in which intelligent parking is supported, for example, an intelligent driving vehicle.

The sensing module may be one or more of a plurality of sensors included in the sensor system 104 in FIG. 1, which may include the positioning system 122, the IMU 124, the radar 126, the laser rangefinder 128, the camera 130, and the like. The positioning system 122 includes a global navigation satellite system (GNSS). The radar 126 includes a lidar, a millimeter-wave radar, and an ultrasonic radar. The camera 130) includes various cameras inside and outside a vehicle, and the like. The sensing module obtains environmental information of a current parking space. The environmental information includes a static or dynamic obstacle around the parking space, a passable area, a lane line, a type of the parking space, an opening direction of the parking space, and the like. The type of the parking space includes a perpendicular parking space, a parallel parking space, an angle parking space, or the like. The sensing module may further obtain an orientation of an ego vehicle relative to the current parking space.

The sensing module inputs the obtained environmental information into the data module and the control module. The data module analyzes the environmental information and matches the current parking space with a historical record. If there is a historical pull-out record of the current parking space for a user, the historical pull-out record is obtained. If there is no historical pull-out record of the current parking space for a user, a historical pull-out record of a parking space similar to the current parking space is obtained.

The data module inputs the obtained historical record into the control module, and the control module generates optional pull-out solutions for the current parking space with reference to the environmental information obtained by the sensing module and the historical record obtained by the data module. The optional pull-out solutions include a pull-out solution recommended to the user.

The control module displays optional pull-out solutions and a recommended pull-out solution on the display assembly like a human machine interface (HMI). The display assembly includes an interface, for example, a display or a central display screen inside the vehicle, that can interact with the user. The user may make selection from the optional pull-out solutions and the recommended pull-out solution that are displayed. Alternatively, when the user does not make selection, it is considered that the recommended pull-out solution is used. The control module enables the vehicle to pull out of the current parking space based on a pull-out solution selected by the user or the recommended pull-out solution.

The data module stores, in the historical record, the pull-out solutions for pulling out of the current parking space. The pull-out solutions include the recommended pull-out solution and the pull-out solution selected by the user.

FIG. 3 is a schematic flowchart of a method for determining a pull-out direction according to an embodiment of this application. The method includes step 301 and step 302. Detailed descriptions are provided below. The method for determining a pull-out direction shown in FIG. 3 may be applied to a scenario in which intelligent parking is supported, for example, an intelligent driving vehicle.

S301: Obtain environmental information of a current parking space and a parking record of a vehicle.

The environmental information includes real-time environmental information of the current parking space, a location of the parking space, a type of the parking space, an opening direction of the parking space, an orientation of the vehicle relative to the current parking space, and the like. When the vehicle is the vehicle 100 in FIG. 1, the environmental information may be obtained by the sensor system 104: the environmental information of the current parking space, the type of the parking space, the opening direction of the parking space, and the orientation of the vehicle relative to the current parking space may be comprehensively determined by the IMU, the radar, the laser rangefinder, the camera, and the like; and the location of the parking space may be determined by the positioning system based on a high-definition map. The real-time environmental information further includes a dynamic or static obstacle around the current parking space, a passable area, a lane line, and the like. The dynamic obstacle is, for example, a pedestrian, an animal, or another driving vehicle that dynamically moves around the parking space. The static obstacle is, for example, a sign, a column, a building, a parking block, or another parking vehicle that is statically placed around the parking space. The passable area includes a passable area without an obstacle and a passable area that is planned based on a corresponding lane line in compliance with a traffic rule. The type of the parking space includes a perpendicular parking space, a parallel parking space, an angle parking space, or the like. According to the method for determining a pull-out direction in this embodiment of this application, different pull-out solutions are designed based on different types of parking spaces and opening directions of parking spaces. Whether the vehicle pulls out from a vehicle front or from a vehicle rear may be determined based on the orientation of the vehicle relative to the current parking space.

The parking record of the vehicle includes a pull-out record and a pull-in record. The pull-out record includes a historical record of pulling out of the current parking space by the vehicle and a historical record of pulling out of a parking space similar to the current parking space by the vehicle. The similar parking space is a parking space whose similarity with the current parking space falls within a preset range. For example, the similar parking space may be set to a parking space whose type is the same as the type of the current parking space in the historical record, or the similar parking space is set to a parking space with obstacle information whose similarity with obstacle information of the current parking space falls within a preset range. Specific similarity and the preset range may be manually preset. The historical record of pulling out of the current parking space further includes a pull-out solution selected by a user from a plurality of optional solutions and a pull-out solution that is recommended by a system and that is automatically executed when the user does not make selection. The historical record of pulling out of the parking space similar to the current parking space further includes a pull-out solution selected by the user from a plurality of optional solutions and a pull-out solution that is recommended by the system and that is automatically executed when the user does not make selection. The parking space similar to the current parking space in the historical record may be determined based on the environmental information of the current parking space. For example, a passable area around the similar parking space is the same as that around the current parking space, and/or a type of the similar parking space is the same as that of the current parking space, and/or an opening direction of the similar parking space is the same as that of the current parking space, and/or an orientation of the vehicle relative to the similar parking space is the same as that of the vehicle relative to the current parking space. A determining standard may be manually set before delivery based on historical data statistics, or may be set to be adjustable by the user. In other words, the user may adjust the determining standard based on a use habit of the user during use. The pull-in record is a record of pulling in the current parking space by the vehicle during current parking, including information such as a steering direction of a steering wheel of the vehicle, a gear, or a speed of the vehicle.

S302: Determine, based on the environmental information and the parking record, a first direction towards which the vehicle pulls out of the current parking space.

In some embodiments, one or more obstacle-free directions of pulling out of the current parking space may be determined based on the environmental information. The obstacle-free direction means that there is no obstacle in the direction and the vehicle pulls out in the direction in compliance with the traffic rule. The pull-out record may be obtained based on login of the user on an in-vehicle infotainment or a mobile phone, and then historical parking information of the user is determined.

A direction towards which the vehicle pulls out for a largest quantity of times is determined in the one or more obstacle-free directions based on the pull-out record. If the vehicle has a historical pull-out record of the current parking space, a direction towards which the vehicle pulls out of the current parking space for a largest quantity of times is obtained. Alternatively, if the vehicle has no historical pull-out record of the current parking space, the parking space similar to the current parking space is determined in the pull-out record, and then a direction towards which the vehicle pulls out of the similar parking space for a largest quantity of times is obtained. In this case, the first direction of pulling out of the current parking space is the direction with the largest quantity of pull-out times, and the first direction is the obstacle-free direction.

Figure 4:
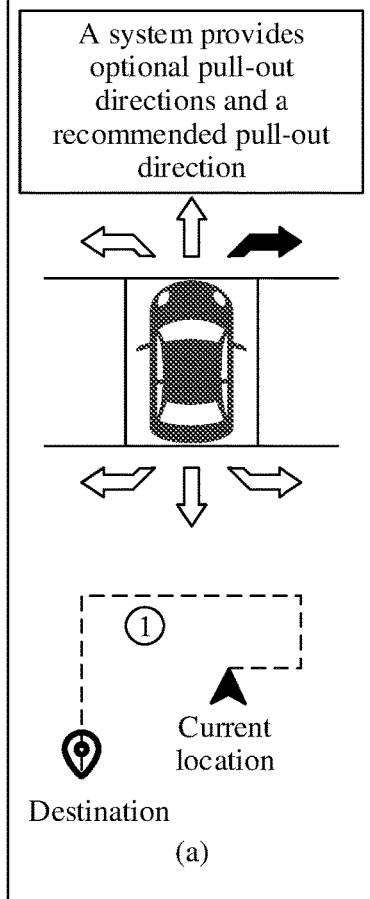
FIG. 4 is a schematic diagram of determining a pull-out direction based on user selection according to an embodiment of this application.
Figure 4:
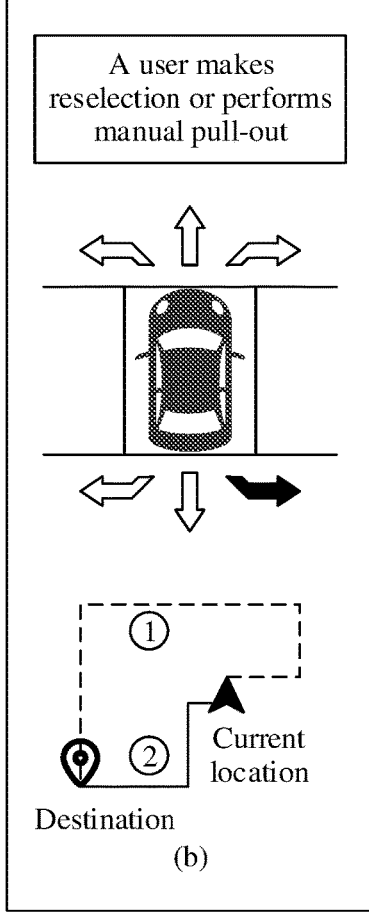
Figure 4:
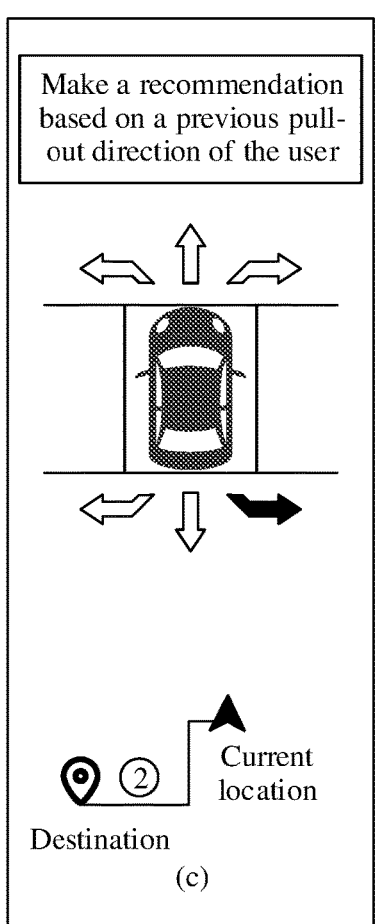

The method in this embodiment of this application further includes: determining, based on the pull-out record, a pull-out direction selected by the user for the current parking space in the pull-out record. The pull-out direction selected by the user herein means that if a direction towards which the vehicle previously pulls out of the current parking space is a direction selected by the user, the direction may be a pull-out direction that is selected by the user from a plurality of optional pull-out parking spaces and that is different from a recommended parking direction, or may be a pull-out direction towards which the user manually pulls the vehicle out of the current parking space without using an intelligent parking function. The first direction of pulling out of the current parking space is a pull-out direction selected by the user in the pull-out record, and the first direction is the obstacle-free direction. A reason for such a design is described below with reference to FIG. 4. An application scenario in FIG. 4 is that a user drives a vehicle with an intelligent parking function to a parking space for the first time. In a vehicle pull-in process, a system may obtain environmental information of the parking space, and analyze and determine the environmental information, so that a feasible pull-out direction is recommended to the user when the user starts an in-vehicle infotainment system again to prepare for pulling the vehicle out of the current parking space. As shown in (a) in FIG. 4, when the user starts the vehicle to pull the vehicle out of the current parking space, the system determines, based on the environmental information and a pull-out record, six optional pull-out directions of pulling out of the current parking space: left front, front, right front, left rear, rear, and right rear directions, and a recommended pull-out direction is the right front direction. However, as shown in (a) in the figure, if the vehicle pulls out in the recommended right front pull-out direction, the user needs to drive to a destination along a route 1, and the route @ is longer. Therefore, as shown in (b) in the figure, to drive to the destination along a shorter route 2, the user actively reselects the right rear direction as the pull-out direction from the six optional pull-out directions, or the user may directly manually drive the vehicle to pull out of the current parking space in the right rear direction. The system records and learns a pull-out solution currently selected by the user, including information such as a steering direction of a steering wheel, a gear, a speed of the vehicle, a straight travel length, and a curve travel radian during parking. It should be understood that, in a case in which the user performs manual pull-out, the system records and learns a behavior attitude of the vehicle that is successfully pulled out by the user for the first time, but ignores another behavior attitude of the vehicle that fails to be pulled out by the user and behavior attitudes such as fine-tuning and movement of the vehicle. As shown in (c) in the figure, when the user parks in the parking space for the second time, and the user starts the vehicle to pull the vehicle out of the parking space, the system still determines six optional pull-out directions based on the environmental information of the current parking space, and determines, based on the pull-out direction previously selected by the user in the pull-out record of the user, that the recommended pull-out direction is the right rear direction. In this case, after pulling out of the current parking space in the right rear direction, the vehicle can travel to the destination along the shortest route 2. This improves user experience.

It should be understood that FIG. 4 is merely an example of the reason for determining a pull-out direction based on user selection. To be specific, a route that is to a destination and that is determined based on the pull-out direction selected by the user is shorter than a route that is to the destination and that is determined based on the direction with the largest quantity of pull-out times. This does not constitute a limitation on this application. In actual application, there is definitely a reason why the user selects a pull-out direction different from the recommended pull-out direction. The reason may be that the user can more conveniently arrive at the destination, or that a route determined based on the pull-out direction selected by the user better meets a preference of the user. In the method in this embodiment of this application, these possibilities are fully considered, and the pull-out direction is recommended based on user selection, so that user experience can be further improved.

Figure 5:
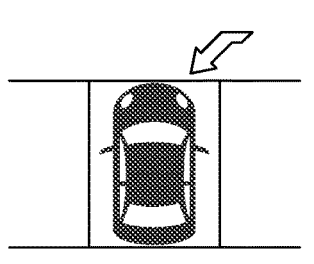
FIG. 5 is a schematic diagram of determining a pull-out direction based on a pull-in direction according to an embodiment of this application.
Figure 5:
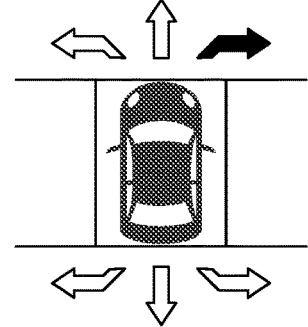

The method in this embodiment of this application further includes: determining, based on the pull-in record, a direction towards which the vehicle pulls in the current parking space during current parking, where the direction of pulling in the current parking space herein is a direction towards which the vehicle travels to the current parking space; and then determining, based on the direction of pulling in the current parking space, the first direction of pulling out of the current parking space, where the first direction is the obstacle-free direction. For example, as shown in FIG. 5, when the vehicle travels from the right front direction to the current parking space, and then pulls in the current parking space, the right front direction is recommended as the pull-out direction when the user intends to pull the vehicle out of the current parking space.

According to the method in this embodiment of this application, when the pull-out direction is recommended to the user, the vehicle should observe a preset traffic rule, so that driving safety is ensured. Different countries have different traffic rules. For example, vehicles in some countries travel on the right, and vehicles in some countries travels on the left. According to the method in this embodiment of this application, when the pull-out direction is recommended to the user, the vehicle should observe the preset traffic rule. Corresponding traffic rules should be set before delivery, and these traffic rules may be automatically updated in real time through upgrade of an over the air technology (OTA). An example in which the vehicle travels on the right is used. According to the method in this embodiment of this application, when the pull-out direction is recommended to the user, it should be considered that the vehicle may travel on a road in a right direction after pulling out of the current parking space.

According to the method in this embodiment of this application, after one or more obstacle-free directions of pulling out of the current parking space are determined based on the environmental information, the one or more obstacle-free directions may be displayed on an interaction interface, and are used as optional directions for user selection. The recommended first direction is included in the one or more obstacle-free directions. As shown in (a) in FIG. 4, there are six optional directions: left front, front, right front, left rear, rear, and right rear directions, and the right front direction is the recommended first direction. When the user does not make selection within specific preset duration, the vehicle pulls out of the current parking space in the recommended first direction.

It should be understood that the vehicle may pull out from a vehicle front or from a vehicle rear when pulling out of the current parking space.

Figure 6:
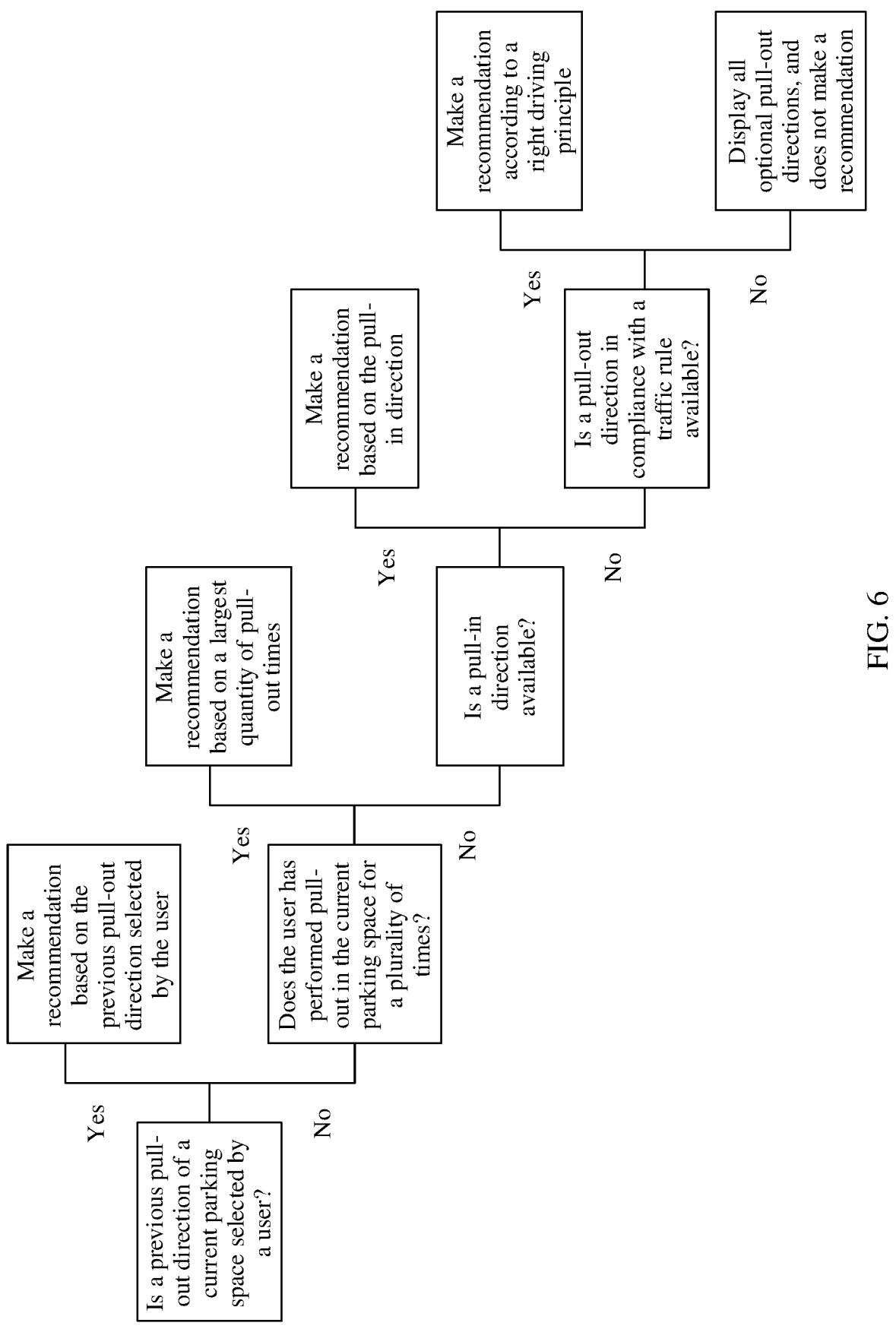
FIG. 6 is a schematic diagram of a possible priority sequence of a pull-out solution according to an embodiment of this application.

For the foregoing plurality of solutions for determining the first direction of pulling out of the current parking space, the plurality of solutions may be sorted based on a preset priority. When a solution with a higher priority is not feasible, a solution with a next higher priority is considered. The priority may be set before delivery, or may be set to be adjustable by the user. To be specific, the user may adjust, based on a use habit of the user during use, priorities of the plurality of solutions for determining the first direction of pulling out of the current parking space. FIG. 6 shows a priority order according to an embodiment of this application for reference. First, whether the user selects, in a previous pull-out record of the current parking space, a pull-out direction different from the recommended pull-out direction or the user manually controls the vehicle to pull out of the current parking space is determined based on the pull-out record. If it is determined that the user selects the pull-out direction different from the recommended pull-out direction, a current pull-out direction is recommended based on a previous pull-out direction selected by the user. If the user does not select, in the previous pull-out record of the current parking space, the direction different from the recommended direction, but defaults or selects a pull-out direction recommended by the system, whether the user has performed pull-out in the current parking space for a plurality of times is further determined based on the pull-out record. If the user has performed pull-out in the current parking space for the plurality of times, and a pull-out direction with a largest quantity of pull-out times in the plurality of pull-out times may be obtained based on the pull-out record, the pull-out direction with the largest quantity of pull-out times is used as the current pull-out direction. If a pull-out direction with a largest quantity of pull-out times in the plurality of pull-out times cannot be obtained based on the pull-out record, for example, there are two pull-out records of the current parking space for the user, one record is a pull-out direction that is different from the recommended pull-out direction and that is selected by the user, and the other record is a default recommended pull-out direction of the user, and the two pull-out directions are different. In this case, the pull-out direction with the largest quantity of pull-out times cannot be obtained based on the two pull-out records. Alternatively, when the user parks in the current parking space for the first time, there is no pull-out record. In this case, whether a current pull-in direction is available is further determined based on the pull-in record. If the current pull-in direction is available, a corresponding pull-out direction is recommended based on the pull-in direction: or if the current pull-in direction is unavailable, for example, a pull-out direction determined based on the pull-in direction is temporarily blocked by an obstacle, whether a pull-out direction in compliance with a traffic rule is available is further determined. If the pull-out direction in compliance with the traffic rule is available, a pull-out direction is recommended based on the pull-out direction in compliance with the traffic rule, so that the vehicle can travel on the right (or on the left, where a travel direction depends on a traffic rule at a geographical location of the vehicle at that time) after pulling out. Alternatively, if the pull-out direction in compliance with the traffic rule is also unavailable, for example, the pull-out direction is also blocked by a temporary obstacle, all remaining optional pull-out directions are displayed on a user interface for user selection, and the system does not make a recommendation. It should be understood that each recommended pull-out direction in FIG. 6 belongs to one of the one or more obstacle-free directions determined based on the environmental information. When the vehicle pulls in the current parking space, a sensor system may obtain the environmental information of the current parking space and analyze the environmental information. Alternatively, when the user starts the in-vehicle infotainment system again, a sensor system may obtain the environmental information of the current parking space again and analyze the environmental information, to ensure that the obtained information is real-time, so that a pull-out direction that is more suitable for the current parking space is recommended to the user. It should be further understood that the priority order shown in FIG. 6 is merely an example of a possible priority order, and does not constitute a limitation on this application. In actual application, the priority order may be set based on another priority order, or the user may adjust the priority order based on a habit of the user.

According to the method for determining a pull-out direction in this embodiment of this application, the direction of pulling out of the current parking space is determined based on the environmental information of the current parking space and the parking record of the vehicle. A plurality of currently optional pull-out directions are determined by comprehensively considering the obstacle information, the lane line information and the type of the current parking space. Further, a pull-out direction that is in the plurality of optional pull-out directions and that is most in line with a habit of the user, that is most convenient for subsequent driving of the user, or that is most suitable for the current parking space is determined based on the parking record. This improves user experience. According to the method for determining a pull-out direction in this embodiment of this application, a plurality of feasible pull-out solutions are provided. These pull-out solutions may be set based on a specific priority sequence, and may be adjusted based on an actual situation, to more flexibly adapt to an actual application scenario. In the method for determining a pull-out direction in this embodiment of this application, each pull-out solution complies with the preset traffic rule, so that user experience is improved and driving safety of the user is ensured.

Figure 7:
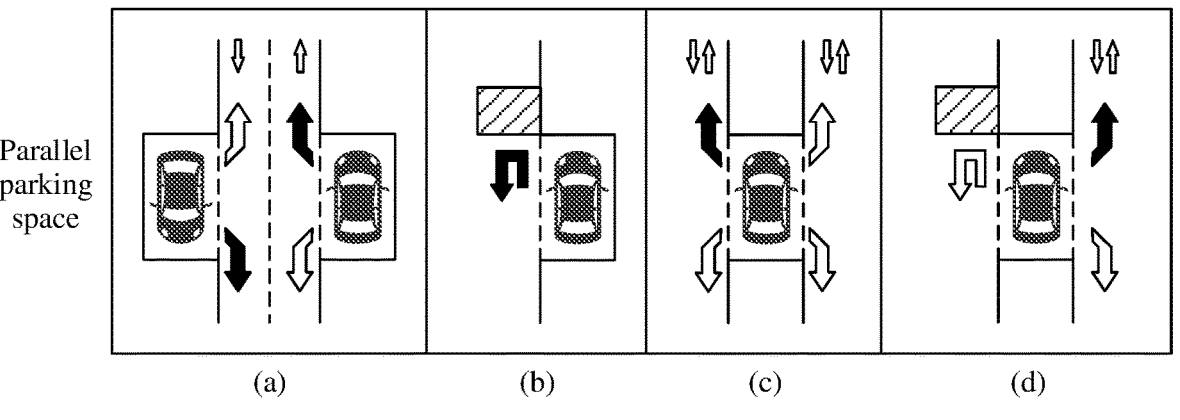
FIG. 7 is a schematic diagram of pull-out in which a type of a parking space is a parallel parking space according to an embodiment of this application.
Figure 8:
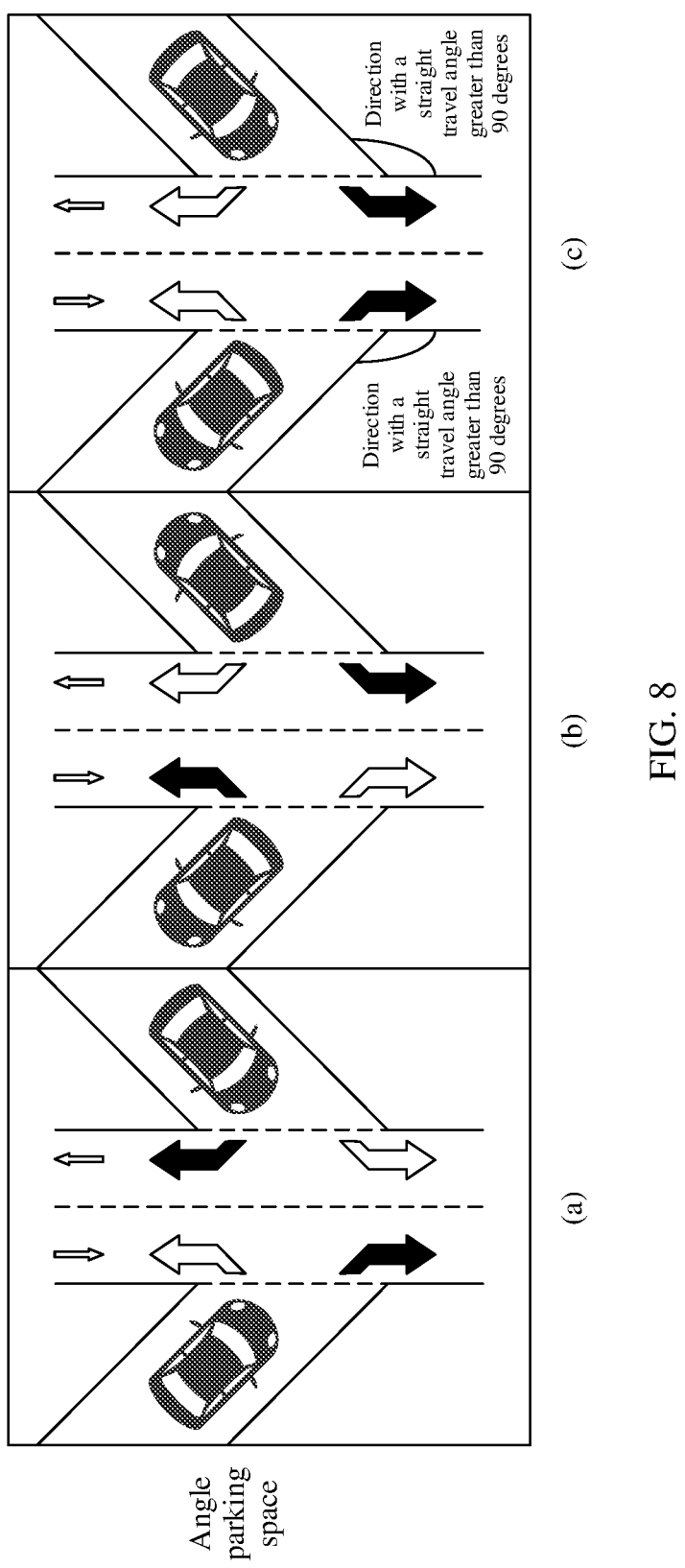
FIG. 8 is a schematic diagram of pull-out in which a type of a parking space is an angle parking space according to an embodiment of this application.
Figure 9:
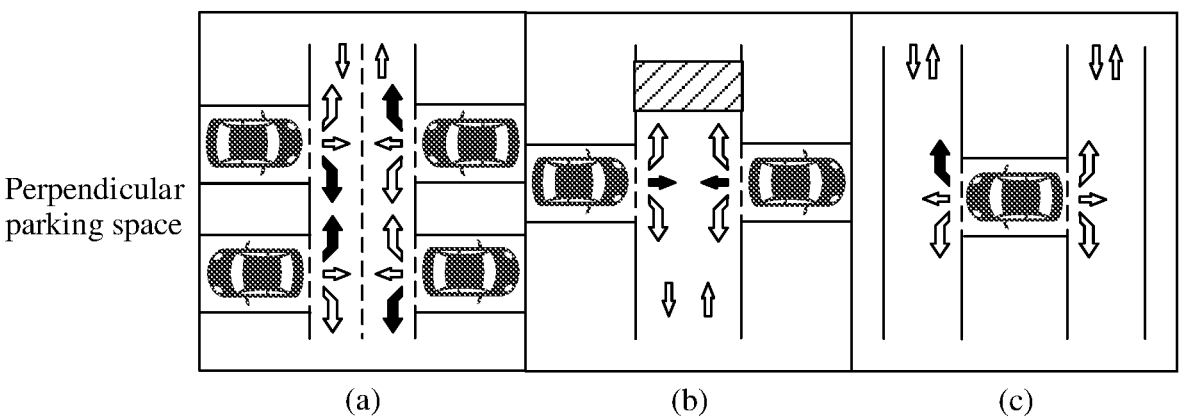
FIG. 9 is a schematic diagram of pull-out in which a type of a parking space is a perpendicular parking space according to an embodiment of this application.

In some implementations of the method for determining a pull-out direction in this embodiment of this application, the method further includes: determining the direction of pulling out of the current parking space based on the environmental information and the preset traffic rule. The environmental information includes the type of the current parking space, the obstacle information, the lane line information, and the like. The preset traffic rule may be flexibly set for different countries and regions. The direction of pulling out of the current parking space determined based on the environmental information and the preset traffic rule in this embodiment of this application is described below in detail with reference to FIG. 7 to FIG. 9. In FIG. 7 to FIG. 9, an example in which the preset traffic rule is travelling on the right is used for description.

FIG. 7 is a schematic diagram of pull-out in which a type of the parking space is a parallel parking space. When obstacle information and lane line information are shown in (a) in FIG. 7, there is no obstacle around the parking space, and the vehicle front is parked in a lane direction. In this case, the left front direction of the vehicle is determined as the recommended pull-out direction. When obstacle information and lane line information are shown in (b) in FIG. 7, there is an obstacle in the left front direction of the parking space, and there is no lane direction indication around the parking space. In this case, a left U-turn direction of the vehicle is determined as the recommended pull-out direction. When obstacle information and lane line information are shown in (c) in FIG. 7, the vehicle can pull out of the parking space from both left and right directions, there is no obstacle around the parking space, and there are bidirectional lanes in the left and right directions of the parking space. In this case, the left front direction of the vehicle is determined as the recommended pull-out direction. When obstacle information and lane line information are shown in (d) in FIG. 7, the vehicle can pull out of the parking space from both left and right directions, but there is an obstacle in the left front direction of the parking space, and there is a bidirectional lane in the right direction of the parking space. In this case, the right front direction of the vehicle is determined as the recommended pull-out direction.

FIG. 8 is a schematic diagram of pull-out in which a type of the parking space is an angle parking space. When obstacle information and lane line information are shown in (a) in FIG. 8, there is no obstacle around the parking space, the vehicle front is parked in a lane direction, and a lane is a unidirectional lane. In this case, the right front direction of the vehicle is determined as the recommended pull-out direction. When obstacle information and lane line information are shown in (b) in FIG. 8, there is no obstacle around the parking space, the vehicle rear is parked in a lane direction, and a lane is a unidirectional lane. In this case, the right rear direction of the vehicle is determined as the recommended pull-out direction. When obstacle information and lane line information are shown in (c) FIG. 8, there is no obstacle around the parking space, and a lane is a bidirectional lane. In this case, regardless of whether the vehicle front faces the lane or the vehicle rear faces the lane, a direction with a straight travel angle greater than 90 degrees is determined as the recommended parking direction. To be specific, when the vehicle front is parked in the lane direction, the left front direction of the vehicle is the recommended pull-out direction, and when the vehicle rear is parked in the lane direction, the left rear direction of the vehicle is the recommended pull-out direction.

FIG. 9 is a schematic diagram of pull-out in which a type of the parking space is a perpendicular parking space. When obstacle information and lane line information are shown in (a) in FIG. 9, there is no obstacle around the parking space, and a lane is a unidirectional lane. In this case, when the vehicle front is parked in a lane direction, the right front direction of the vehicle is determined as the recommended pull-out direction, and the right rear direction of the vehicle is determined as the recommended pull-out direction. When the vehicle rear is parked in a lane direction, the right rear direction of the vehicle is determined as the recommended pull-out direction. When the recommended direction in (a) in FIG. 9 is blocked by an obstacle, as shown in (b) in FIG. 9, a direction of pulling out of the parking space straight is determined as the recommended pull-out direction. When obstacle information and lane line information are shown in (c) in FIG. 9, there is no obstacle around the parking space, and there are lanes for pulling out from the vehicle front and the vehicle rear, and the lanes are unidirectional lanes. In this case, the right front direction of the vehicle is determined as the recommended pull-out direction.

It should be understood that, in addition to the recommended pull-out directions in FIG. 7 to FIG. 9, another pull-out direction may also be selected by the user. In some scenarios, if the recommended pull-out directions in FIG. 7 to FIG. 9 cannot implement vehicle pull-out, the pull-out directions are not recommended to the user, and optional pull-out directions are directly displayed on the user interface for user selection.

It should be further understood that the pull-out solutions in FIG. 7 to FIG. 9 are merely examples of the method in embodiments of this application, and do not constitute a limitation on the method in embodiments of this application.

When there is no pull-out record of the current parking space in the parking record and there is no pull-out record of a parking space similar to the current parking space, and a priority of a solution for determining the pull-out direction based on the pull-in record is lower, a direction of pulling out of the current parking space may be determined based on the environmental information and the preset traffic rule in FIG. 7 to FIG. 9. This ensures that the vehicle can provide optional pull-out solutions for the user in various parking environments, so that user experience is improved. In addition, all these pull-out solutions comply with the preset traffic rule, so that driving safety is ensured.

When the vehicle is parked at a location without a lane line, a type of a parking space similar to the current location of the vehicle may be determined based on the environmental information, and then a pull-out direction is determined based on the type of the parking space. For example, the vehicle is parked on a roadside without a lane line and is parallel to a road. In this case, a parking location of the vehicle may be considered as a parallel parking space type of the parking space in FIG. 7, and then the pull-out direction of the vehicle is determined by referring to the foregoing descriptions in FIG. 7. Alternatively, when the vehicle is parked at a location without a lane line, a pull-out direction of the vehicle may be directly determined based on the obstacle information around the vehicle, the lane line information, or the preset traffic rule. For example, one or more obstacle-free directions are determined as optional pull-out directions based on the obstacle information around the vehicle, and then a recommended pull-out direction is determined based on the lane line information and the preset traffic rule, so that the vehicle can continue to travel on the right (or left) after pulling out.

Figure 10:
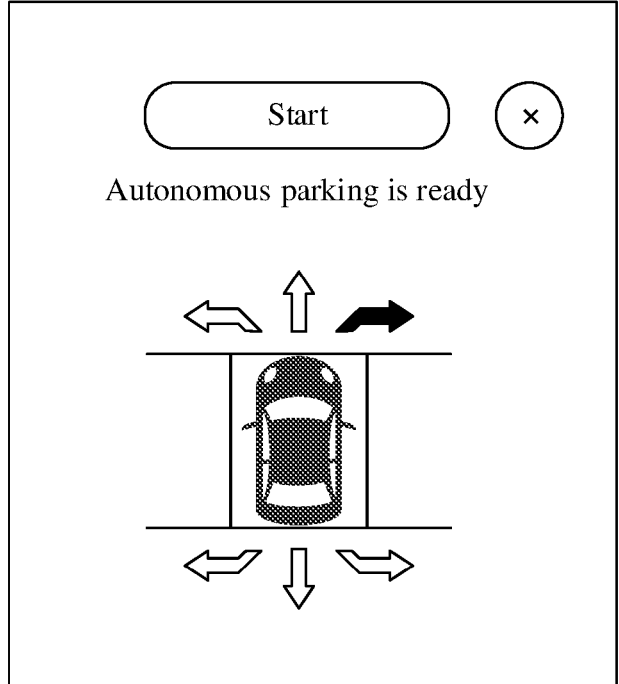
FIG. 10 is a schematic diagram of optional pull-out directions and a recommended pull-out direction that are on a user interface according to an embodiment of this application.

According to the method for determining a pull-out direction in embodiments of this application, a pull-out interaction process between the user and an in-vehicle infotainment is simplified. FIG. 10 is a schematic diagram of optional pull-out directions and a recommended pull-out direction that are on a user interface and that are determined according to the method for determining a pull-out direction in embodiments of this application. A user gets on the vehicle and starts an in-vehicle infotainment system. When detecting that the vehicle is in a parking space, the system directly switches to a pull-out start interface, and provides optional pull-out directions and a recommended pull-out direction. The user only needs to tap a start button to start autonomous pull-out in the recommended pull-out direction, or when the user does not perform an operation within preset duration, it may be considered that the user performs pull-out in the recommended pull-out direction by default. Alternatively, the user can reselect another optional pull-out direction to start autonomous pull-out. It should be understood that, in the method in embodiments of this application, the user may control an interface in any feasible control manner like a touch operation, voice instruction control, or gesture instruction control.

The method for determining a pull-out direction provided in embodiments of this application is described above in detail with reference to FIG. 3 to FIG. 10. An apparatus for determining a pull-out direction provided in embodiments of this application is described below in detail with reference to FIG. 11 to FIG. 12. It should be understood that descriptions of the apparatus embodiments correspond to the descriptions of the method embodiments. Therefore, for content that is not described in detail, refer to the foregoing method embodiments. For brevity, details are not described herein again.

Figure 11:
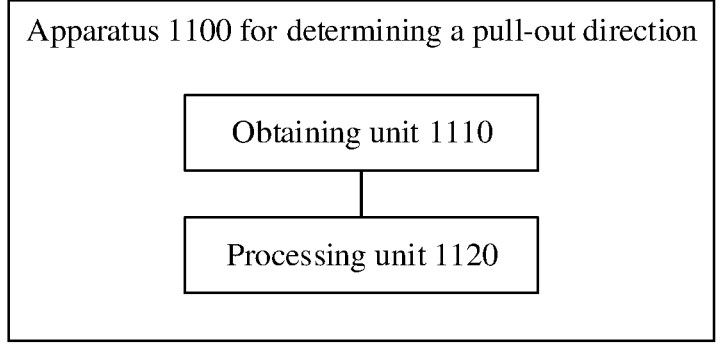
FIG. 11 is a schematic block diagram of an apparatus for determining a pull-out direction according to an embodiment of this application.

FIG. 11 is a schematic block diagram of an apparatus for determining a pull-out direction according to an embodiment of this application. The apparatus 1100 includes an obtaining unit 1110 and a processing unit 1120. The obtaining unit 1110 may implement a corresponding communication function, and the processing unit 1120 is configured to process data. The obtaining unit 1110 may also be referred to as a communication interface or a communication unit.

In some embodiments, the apparatus 1100 may further include a storage unit. The storage unit may be configured to store instructions and/or data. The processing unit 1120 may read the instructions and/or data in the storage unit, so that the apparatus implements the foregoing method embodiments.

The apparatus 1100 may include a unit configured to perform FIG. 3. In addition, the units in the apparatus 1100 and the foregoing other operations and/or functions are separately used to implement a corresponding procedure in the method embodiment in FIG. 3.

When the apparatus 1100 is configured to perform the method 300 in FIG. 3, the obtaining unit 1110 may be configured to perform step 301 in the method 300; and the processing unit 1120 may be configured to perform step 302 in the method 300.

In some embodiments, the obtaining unit 1110 is configured to obtain environmental information of a current parking space and a parking record of a vehicle. The processing unit 1120 is configured to determine, based on the environmental information and the parking record, a first direction towards which the vehicle pulls out of the current parking space.

In a possible implementation, the environmental information includes at least one of obstacle information, lane line information, and a parking space type of the current parking space.

In a possible implementation, the parking record includes a pull-out record and a pull-in record, the pull-out record includes historical records of pulling out of the current parking space and another parking space by the vehicle, and the pull-in record includes a historical record of pulling in the current parking space by the vehicle.

In a possible implementation, the processing unit 1120 is configured to: determine, based on the environmental information, one or more obstacle-free directions in which the vehicle pulls out of the current parking space; and determine a first direction based on the parking record and the one or more obstacle-free directions.

In a possible implementation, the processing unit 1120 is configured to: determine, based on the parking record, a direction with a largest quantity of pull-out times in the one or more obstacle-free directions; and use the direction with the largest quantity of pull-out times in the one or more obstacle-free directions as the first direction.

In a possible implementation, the direction with the largest quantity of pull-out times includes a direction towards which the vehicle pulls out of the current parking space for a largest quantity of times and a direction towards which the vehicle pulls out of a similar parking space for a largest quantity of times, and the similar parking space is a parking space whose similarity with the current parking space falls within a preset range.

In a possible implementation, the processing unit 1120 is configured to: determine, based on the parking record, a pull-out direction selected by a user for the current parking space in the parking record; and determine the first direction based on the one or more obstacle-free directions and the pull-out direction selected by the user for the current parking space, where the first direction is the pull-out direction selected by the user for the current parking space in the parking record, and the first direction is the obstacle-free direction.

In a possible implementation, a route that is to a destination and that is determined based on the pull-out direction selected by the user for the current parking space is shorter than a route that is to the destination and that is determined based on the direction with the largest quantity of pull-out times.

In a possible implementation, the processing unit 1120 is configured to: determine, based on the parking record, a direction towards which the vehicle pulls in the current parking space in the parking record; and determine, based on a direction towards which the vehicle pulls in the current parking space last time in the parking record, the first direction towards which the vehicle pulls out of the current parking space, where the first direction is the obstacle-free direction.

In a possible implementation, the processing unit 1120 is further configured to determine, based on the environmental information, the parking record, a preset traffic rule, or the parking space type of the current parking space, the first direction of pulling out of the current parking space.

In a possible implementation, the processing unit 1120 is further configured to: display the one or more obstacle-free directions on an interaction interface for user selection, where the one or more obstacle-free directions include the first direction; and pull out of the current parking space in the direction selected by the user from the one or more obstacle-free directions, or pull out of the current parking space in the first direction when the user does not make selection.

It should be understood that an exemplary process in which the units perform the foregoing corresponding steps is described in detail in the foregoing method embodiments. For brevity, details are not described herein.

The processing unit in FIG. 11 may be implemented by at least one processor or a processor-related circuit, the obtaining unit may be implemented by a transceiver or a transceiver-related circuit, and the storage unit may be implemented by at least one memory.

Figure 12:
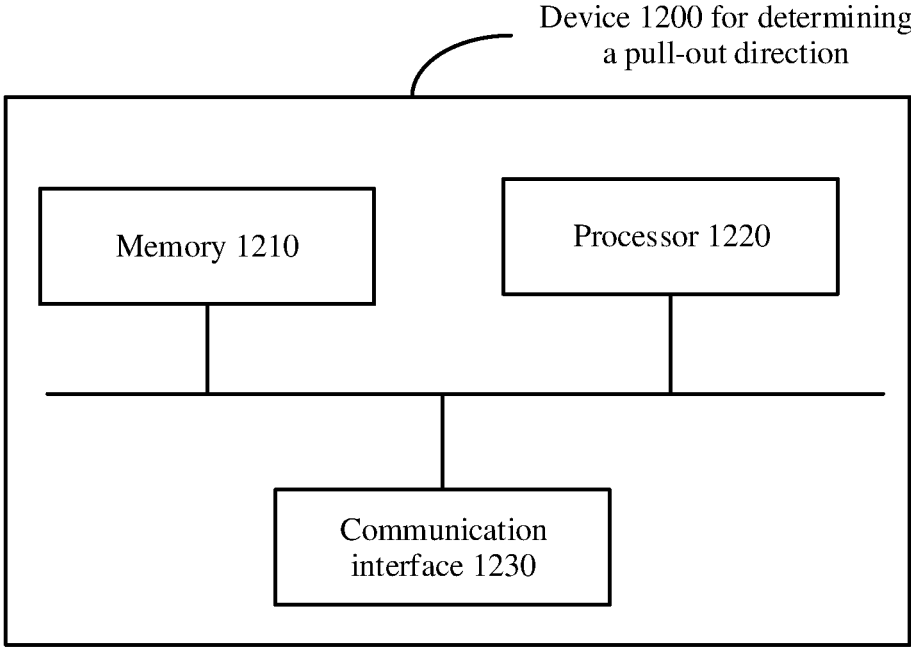
FIG. 12 is a schematic block diagram of a parking device according to an embodiment of this application.

FIG. 12 is a schematic block diagram of a parking device according to an embodiment of this application. The parking device 1200 shown in FIG. 12 may include a memory 1210, a processor 1220, and a communication interface 1230. The memory 1210, the processor 1220, and the communication interface 1230 are connected through an internal connection path. The memory 1210 is configured to store instructions, and the processor 1220 is configured to execute the instructions stored in the memory 1220, to control an input/output interface 1230 to receive/send at least some parameters of a second channel model. In some embodiments, the memory 1210 may be coupled to the processor 1220 through an interface, or may be integrated with the processor 1220.

It should be noted that the communication interface 1230 implements communication between the communication device 1200 and another device or a communication network by using, for example but not limited to, a transceiver apparatus like a transceiver. The communication interface 1230 may further include an input/output interface.

In an implementation process, the steps in the foregoing method can be implemented by using an integrated logic circuit of hardware in the processor 1220, or by using instructions in a form of software. The method disclosed with reference to embodiments of this application may be directly performed by a hardware processor, or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 1210. The processor 1220 reads information from the memory 1210, and performs the steps in the foregoing method in combination with hardware of the processor. To avoid repetition, details are not described herein again.

It should be understood that, the processor in embodiments of this application may be a central processing unit (CPU), or may be another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, or the processor may be any conventional processor or the like.

It should also be understood that in embodiments of this application, the memory may include a read-only memory and a random access memory, and provide instructions and data to the processor. A part of the processor may further include a non-volatile random access memory. For example, the processor may further store information of a device type.

It should be understood that the term "and/or" in this specification describes only an association relationship between associated objects and indicates that three relationships may exist. For example, A and/or B may indicate the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

An embodiment of this application further provides a computing device, including at least one processor and a memory. The at least one processor is coupled to the memory, and is configured to read and execute instructions in the memory, to perform any method in FIG. 3 to FIG. 10.

An embodiment of this application further provides a computer-readable medium. The computer-readable medium stores program code, and when the computer program code is run on a computer, the computer is enabled to perform any method in FIG. 3 to FIG. 10.

An embodiment of this application further provides a chip, including at least one processor and a memory. The at least one processor is coupled to the memory, and is configured to read and execute instructions in the memory, to perform any method in FIG. 3 to FIG. 10.

An embodiment of this application further provides an autonomous driving vehicle, including at least one processor and a memory. The at least one processor is coupled to the memory, and is configured to read and execute instructions in the memory, to perform any method in FIG. 3 to FIG. 10.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As illustrated by using figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on a signal having one or more data packets (for example, data from two components interacting with another component in a local system, in a distributed system, and/or across a network such as the Internet interacting with another system by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it shall not be considered that the implementation goes beyond the scope of this application.

It may be understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on an actual requirement to achieve the objectives of the solutions in embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely exemplary implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a pull-out direction, applied to an apparatus that comprises at least one processor, comprising:

obtaining, by the at least one processor, environmental information of a current parking space and a parking record of a vehicle; and determining, by the at least one processor based on the environmental information and the parking record, a first direction towards which the vehicle pulls out of the current parking space, wherein the determining, by the at least one processor based on the environmental information and the parking record, the first direction towards which the vehicle pulls out of the current parking space comprises:

determining, based on the environmental information, one or more obstacle-free directions in which the vehicle pulls out of the current parking space; and determining, by the at least one processor, the first direction based on the parking record and the one or more obstacle-free directions; and wherein the determining, by the at least one processor, the first direction based on the parking record and the one or more obstacle-free directions comprises:

determining, by the at least one processor based on the parking record, a pull-out direction selected by a user for the current parking space in the parking record; and determining, by the at least one processor, the first direction based on the one or more obstacle-free directions and the pull-out direction selected by the user for the current parking space, wherein the first direction is the pull-out direction selected by the user for the current parking space in the parking record, and the first direction is an obstacle-free direction of the one or more obstacle-free directions.

2. The method according to claim 1, wherein the environmental information comprises at least one of obstacle information, lane line information, and a parking space type of the current parking space.

3. The method according to claim 1, wherein the parking record comprises a pull-out record and a pull-in record, the pull-out record comprises historical records of pulling out of the current parking space and another parking space by the vehicle, and the pull-in record comprises a historical record of pulling in the current parking space by the vehicle.

4. The method according to claim 1, wherein a route that is to a destination and that is determined based on the pull-out direction selected by the user for the current parking space is shorter than a route that is to the destination and that is determined based on a direction with a largest quantity of pull-out times in the one or more obstacle-free directions.

5. The method according to claim 1, wherein the method further comprises:

displaying, by the at least one processor, the one or more obstacle-free directions on an interaction interface for user selection, wherein the one or more obstacle-free directions comprise the first direction; and pulling out of the current parking space, by the at least one processor, in a direction selected by a user from the one or more obstacle-free directions; or pulling out of the current parking space, by the at least one processor, in the first direction based on the user not making a selection.

6. The method according to claim 1, wherein the method further comprises:

determining, by the at least one processor based on the environmental information, the parking record, a preset traffic rule, or a parking space type of the current parking space, the first direction of pulling out of the current parking space.

7. The method of claim 4, wherein the environmental information comprises at least one of obstacle information, lane line information, and a parking space type of the current parking space.

8. The method according to claim 4, wherein the parking record comprises a pull-out record and a pull-in record, the pull-out record comprises historical records of pulling out of the current parking space and another parking space by the vehicle, and the pull-in record comprises a historical record of pulling in the current parking space by the vehicle.

9. The method according to claim 4, wherein the method further comprises:

displaying, by the at least one processor, the one or more obstacle-free directions on an interaction interface for user selection, wherein the one or more obstacle-free directions comprise the first direction; and pulling out of the current parking space, by the at least one processor, in a direction selected by a user from the one or more obstacle-free directions; or pulling out of the current parking space, by the at least one processor, in the first direction based on the user not making a selection.

10. The method according to claim 4, wherein the method further comprises:

determining, by the at least one processor based on the environmental information, the parking record, a preset traffic rule, or a parking space type of the current parking space, the first direction of pulling out of the current parking space.

11. A method for determining a pull-out direction, applied to an apparatus that comprises at least one processor, comprising:

obtaining, by the at least one processor, environmental information of a current parking space and a parking record of a vehicle; and determining, by the at least one processor based on the environmental information and the parking record, a first direction towards which the vehicle pulls out of the current parking space, wherein the determining, by the at least one processor based on the environmental information and the parking record, the first direction towards which the vehicle pulls out of the current parking space comprises:

determining, by the at least one processor based on the environmental information, one or more obstacle-free directions in which the vehicle pulls out of the current parking space; and determining, by the at least one processor, the first direction based on the parking record and the one or more obstacle-free directions, and wherein the determining, by the at least one processor, the first direction based on the parking record and the one or more obstacle-free directions comprises:

determining, by the at least one processor based on the parking record, a direction with a largest quantity of pull-out times in the one or more obstacle-free directions; and using, by the at least one processor, the direction with the largest quantity of pull-out times in the one or more obstacle-free directions as the first direction.

12. The method according to claim 11, wherein the direction with the largest quantity of pull-out times comprises a direction towards which the vehicle pulls out of the current parking space for a largest quantity of times or a direction towards which the vehicle pulls out of a similar parking space for a largest quantity of times, and the similar parking space is a parking space whose similarity with the current parking space falls within a preset range.

13. A method for determining a pull-out direction, applied to an apparatus that comprises at least one processor, comprising:

obtaining, by the at least one processor, environmental information of a current parking space and a parking record of a vehicle; and determining, by the at least one processor based on the environmental information and the parking record, a first direction towards which the vehicle pulls out of the current parking space, wherein the determining, by the at least one processor based on the environmental information and the parking record, the first direction towards which the vehicle pulls out of the current parking space comprises:

determining, by the at least one processor based on the environmental information, one or more obstacle-free directions in which the vehicle pulls out of the current parking space; and determining, by the at least one processor, the first direction based on the parking record and the one or more obstacle-free directions, and wherein the determining, by the at least one processor, the first direction based on the parking record and the one or more obstacle-free directions comprises:

determining, by the at least one processor based on the parking record, a direction towards which the vehicle pulls in the current parking space in the parking record; and determining, by the at least one processor based on a direction towards which the vehicle pulls in the current parking space last time in the parking record, the first direction towards which the vehicle pulls out of the current parking space, wherein the first direction is an obstacle-free direction of the one or more obstacle-free directions.

14. An apparatus for determining a pull-out direction, comprising:

at least one processor; and a memory coupled to the at least one processor and storing programming instructions for execution by the at least one processor, the programming instructions instruct the at least one processor to perform the following operations:

obtaining environmental information of a current parking space and a parking record of a vehicle; and determining, based on the environmental information and the parking record, a first direction towards which the vehicle pulls out of the current parking space, wherein the determining, based on the environmental information and the parking record, the first direction towards which the vehicle pulls out of the current parking space comprises:

determining, based on the environmental information, one or more obstacle-free directions in which the vehicle pulls out of the current parking space; and determining the first direction based on the parking record and the one or more obstacle-free directions; and wherein the determining the first direction based on the parking record and the one or more obstacle-free directions comprises:

determining, based on the parking record, a pull-out direction selected by a user for the current parking space in the parking record; and

27 determining the first direction based on the one or more obstacle-free directions and the pull-out direction selected by the user for the current parking space, wherein the first direction is the pull-out direction selected by the user for the current parking space in the parking record, and the first direction is an obstacle-free direction of the one or more obstacle-free directions.

15. The apparatus according to claim 14, wherein the environmental information comprises at least one of obstacle information, lane line information, and a parking space type of the current parking space.

16. The apparatus according to claim 14, wherein the parking record comprises a pull-out record and a pull-in record, the pull-out record comprises historical records of pulling out of the current parking space and another parking space by the vehicle, and the pull-in record comprises a historical record of pulling in the current parking space by the vehicle.

17. The apparatus according to claim 14, wherein a route that is to a destination and that is determined based on the pull-out direction selected by the user for the current parking space is shorter than a route that is to the destination and that is determined based on a direction with a largest quantity of pull-out times in the one or more obstacle-free directions.

18. An apparatus for determining a pull-out direction, comprising:
at least one processor; and
a memory coupled to the at least one processor and storing programming instructions for execution by the at least one processor, the programming instructions instruct the at least one processor to perform the following operations:
obtaining environmental information of a current parking space and a parking record of a vehicle; and
determining, based on the environmental information and the parking record, a first direction towards which the vehicle pulls out of the current parking space,
wherein the determining, based on the environmental information and the parking record, a first direction towards which the vehicle pulls out of the current parking space comprises:
determining, based on the environmental information, one or more obstacle-free directions in which the vehicle pulls out of the current parking space; and
determining the first direction based on the parking record and the one or more obstacle-free directions, and
wherein the determining the first direction based on the parking record and the one or more obstacle-free directions comprises:

determining, based on the parking record, a direction with a largest quantity of pull-out times in the one or more obstacle-free directions; and
using the direction with the largest quantity of pull-out times in the one or more obstacle-free directions as the first direction.

19. The apparatus according to claim 18, wherein the direction with the largest quantity of pull-out times comprises a direction towards which the vehicle pulls out of the current parking space for a largest quantity of times and a direction towards which the vehicle pulls out of a similar parking space for a largest quantity of times, and the similar parking space is a parking space whose similarity with the current parking space falls within a preset range.

20. An autonomous driving vehicle, comprising at least one processor and a memory, wherein the at least one processor is coupled to the memory, and is configured to read and execute instructions stored in the memory, to perform:
obtaining environmental information of a current parking space and a parking record of a vehicle; and
determining, based on the environmental information and the parking record, a first direction towards which the vehicle pulls out of the current parking space,
wherein the determining, based on the environmental information and the parking record, the first direction towards which the vehicle pulls out of the current parking space comprises:
determining, based on the environmental information, one or more obstacle-free directions in which the vehicle pulls out of the current parking space; and
determining the first direction based on the parking record and the one or more obstacle-free directions; and
wherein the determining the first direction based on the parking record and the one or more obstacle-free directions comprises:
determining, based on the parking record, a pull-out direction selected by a user for the current parking space in the parking record; and
determining the first direction based on the one or more obstacle-free directions and the pull-out direction selected by the user for the current parking space, wherein the first direction is the pull-out direction selected by the user for the current parking space in the parking record, and the first direction is an obstacle-free direction of the one or more obstacle-free directions.

* * * * *